(12) United States Patent
Kurokawa et al.

(10) Patent No.: US 8,728,199 B2
(45) Date of Patent: May 20, 2014

(54) HYDROGEN SEPARATION MEMBRANE AND METHOD FOR SEPARATING HYDROGEN

(75) Inventors: Hideto Kurokawa, Tokyo (JP); Takumi Nishii, Tokyo (JP); Yoshinori Shirasaki, Tokyo (JP); Isamu Yasuda, Tokyo (JP); Masahiko Morinaga, Nagoya (JP); Hiroshi Yukawa, Nagoya (JP); Tomonori Nanbu, Suzuka (JP); Yoshihisa Matsumoto, Oita (JP)

(73) Assignees: Tokyo Gas Co., Ltd., Tokyo (JP); National University Corporation Nagoya University, Nagoya-shi (JP); Institute of National Colleges of Technology, Japan, Hachioji-shi (JP)

( * ) Notice: Subject to any disclaimer, the term of this patent is extended or adjusted under 35 U.S.C. 154(b) by 177 days.

(21) Appl. No.: 13/395,826

(22) PCT Filed: Sep. 14, 2010

(86) PCT No.: PCT/JP2010/065788
§ 371 (c)(1),
(2), (4) Date: Apr. 18, 2012

(87) PCT Pub. No.: WO2011/030902
PCT Pub. Date: Mar. 17, 2011

(65) Prior Publication Data
US 2012/0192712 A1      Aug. 2, 2012

(30) Foreign Application Priority Data
Sep. 14, 2009   (JP) ................................. 2009-212357

(51) Int. Cl.
*B01D 53/22*   (2006.01)
*B01D 71/02*   (2006.01)
*C22C 27/02*   (2006.01)

(52) U.S. Cl.
USPC .................. 95/8; 95/14; 95/15; 95/19; 95/56; 96/4; 420/425; 702/22

(58) Field of Classification Search
USPC ......... 95/8, 14, 15, 19, 55, 56; 96/4; 420/425, 420/591; 702/22
See application file for complete search history.

(56) References Cited

U.S. PATENT DOCUMENTS 4,063,937 A * 12/1977 Goltsov et al. ..................... 95/56
6,719,831 B2 * 4/2004 Edlund et al. ..................... 95/56

2006/0204799 A1    9/2006  Ishikawa et al.
2007/0248874 A1   10/2007  Aoyama
2008/0000350 A1 *  1/2008  Mundschau et al. ............. 95/56
2008/0284337 A1 * 11/2008  Hendricx ...................... 313/625
2013/0243660 A1 *  9/2013  Kim et al. ......................... 95/56

FOREIGN PATENT DOCUMENTS

| CN | 1640527 A | 7/2005 | |
| JP | H06-108196 A | 4/1994 | |
| JP | 2000-159503 | * 6/2000 | ............. B01D 71/02 |
| JP | 2000-159503 A | 6/2000 | |
| JP | 2001-170460 A | 6/2001 | |
| JP | 2002-206135 | 7/2002 | |
| JP | 2004-42017 A | 2/2004 | |
| JP | 2007-167797 A | 7/2007 | |
| JP | 2008-80234 A | 4/2008 | |
| JP | 2008-88467 A | 4/2008 | |
| JP | 2009-226274 | * 10/2009 | ............. B01D 71/02 |
| JP | 2009-226274 A | 10/2009 | |
| JP | 2010-240637 A | 10/2010 | |

OTHER PUBLICATIONS

Chinese Patent Office, "Office Action for CN 201080039813.1", Oct. 8, 2013.

* cited by examiner

*Primary Examiner* — Jason M Greene
(74) *Attorney, Agent, or Firm* — Manabu Kanesaka

(57) ABSTRACT

Provided is a novel hydrogen separation membrane formed of a Nb—W—Mo-based alloy. A method for separating hydrogen using the hydrogen separation membrane and hydrogen separation conditions are selected by a particular procedure. A hydrogen separation membrane formed of the Nb—W—Mo-based alloy membrane. A method for separating hydrogen using the Nb—W—Mo-based alloy membrane and the conditions for separating hydrogen using the Nb—W—Mo-based alloy membrane are set by measuring the hydrogen pressure P of a hydrogen atmosphere for the Nb—W—Mo-based alloy membrane and the dissolved hydrogen content C of the Nb—W—Mo-based alloy membrane at a temperature T; generating a PCT curve associating the temperature T, the hydrogen pressure P, and the dissolved hydrogen content C on the basis of actual measurement data about the three requirements; and setting operating temperature and primary and secondary hydrogen pressure conditions by determining the relationship between the dissolved hydrogen content C and the brittle fracture of the Nb—W—Mo-based alloy membrane on the basis of the PCT curve to evaluate critical dissolved hydrogen content related to hydrogen embrittlement resistance.

8 Claims, 10 Drawing Sheets

EQUILIBRIUM HYDROGEN PRESSURE AT DISSOLVED HYDROGEN CONCENTRATION H/M = 0.2 AND Mo CONTENT OF Nb-5mol%W-Xmol%Mo ALLOYS COMPARISON OF "LOAD-DEFLECTION" CURVES OF Nb AND Nb-BASED ALLOYS OBTAINED IN HYDROGEN (IN-SITU FRACTURE TEST)

HYDROGEN SEPARATION MEMBRANE AND METHOD FOR SEPARATING HYDROGEN

FIELD OF INVENTION

The present invention relates to a hydrogen separation membrane formed of Nb—W—Mo-based alloy membrane and having superior hydrogen permeation performance and hydrogen embrittlement resistance, a method for separating hydrogen using the hydrogen separation membrane, and a method for setting conditions for separating hydrogen using the hydrogen separation membrane.

BACKGROUND OF INVENTION

There are known hydrogen separation membranes for separating hydrogen from a hydrogen-containing gas by selective permeation. Materials for forming a hydrogen separation membrane include various materials such as various metals, alloys, and ceramics and molecular sieve carbon, a typical example of which is Pd-based alloys (Patent Document 1). A hydrogen separation membrane formed of Pd-based alloy, however, shows only two to three times higher hydrogen separation performance even if a rare earth element, such as Y or Gd, having a great performance-improving effect is added and also has a disadvantage of high cost because Pd itself is a precious metal.

As an alternative to Pd-based alloy membranes, Patent Document 2 discloses a Nb-based-alloy hydrogen separation membrane mainly containing Nb and alloyed with one or more elements selected from the group consisting of V, Ta, Ni, Ti, Mo, and Zr. Patent Document 3 discloses, as a hydrogen separation membrane formed of a Nb alloy, a hydrogen separation membrane formed of a Nb alloy containing 5% to 25% by mass of at least one element selected from the group consisting of Pd, Ru, Re, Pt, Au, and Rh. Patent Document 4 discloses that a Nb foil covered with a Pd membrane on each side has the largest amount of hydrogen permeated as compared with Ta and V foils similarly covered with a Pd membrane on each side.

Patent Document 2 discloses a Nb-based-alloy hydrogen separation membrane formed of an alloy of Nb with one or more of the six elements including V, Ta, Ni, Ti, Mo, and Zr, and Patent Document 3 discloses a hydrogen separation membrane formed of an alloy of Nb with one or more of the six elements including Pd, Ru, Re, Pt, Au, and Rh, although they do not disclose that an alloy membrane of Nb and W or an alloy membrane of Nb, W, and Ta is effective as a hydrogen separation membrane.

Patent Document 1: U.S. Pat. No. 2,773,561
Patent Document 2: Japanese Unexamined Patent Application Publication No. 2000-159503
Patent Document 3: Japanese Unexamined Patent Application Publication No. 2002-206135
Patent Document 4: U.S. Pat. No. 3,350,846

OBJECT AND SUMMARY OF INVENTION

Object of Invention

An object of the present invention is to provide a hydrogen separation membrane formed of a Nb—W—Mo-based alloy membrane, a method for separating hydrogen using a hydrogen separation membrane formed of a Nb—W—Mo-based alloy membrane, and a method for setting conditions for separating hydrogen using a hydrogen separation membrane formed of a Nb—W—Mo-based alloy membrane.

SUMMARY OF INVENTION

A first aspect of the present invention provides a hydrogen separation membrane which is formed of a Nb—W—Mo alloy membrane containing Nb alloyed with W and Mo.

A second aspect of the present invention provides a method for selectively separating hydrogen from a hydrogen-containing gas using a hydrogen separation membrane formed of a Nb—W—Mo alloy membrane containing Nb alloyed with W and Mo.

A third aspect of the present invention provides a method for selectively separating hydrogen from a hydrogen-containing gas using a hydrogen separation membrane formed of a Nb—W—Mo alloy membrane containing Nb alloyed with W and Mo, which includes the steps of:

measuring a hydrogen pressure P of a hydrogen atmosphere for the Nb—W—Mo alloy membrane and a dissolved hydrogen content C of the Nb—W—Mo alloy membrane at a temperature T;

generating a PCT curve associating the temperature T, the hydrogen pressure P, and the dissolved hydrogen content C on the basis of actual measurement data of the temperature, the pressure and the content;

setting an operating temperature of the hydrogen separation membrane and primary and secondary hydrogen pressure conditions by determining a relationship between the dissolved hydrogen content C and a brittle fracture of the Nb—W—Mo alloy membrane on the basis of the PCT curve to evaluate critical dissolved hydrogen content related to hydrogen embrittlement resistance; and separating hydrogen from the hydrogen-containing gas using the Nb—W—Mo alloy membrane under the set conditions.

A fourth aspect of the present invention provides a method for setting conditions for separating hydrogen from a hydrogen-containing gas using a hydrogen separation membrane formed of a Nb—W—Mo alloy membrane, which includes the steps of:

measuring a hydrogen pressure P of a hydrogen atmosphere for the Nb—W—Mo alloy membrane and a dissolved hydrogen content C of the Nb—W—Mo alloy membrane at a temperature T;

generating a PCT curve associating the temperature T, the hydrogen pressure P, and the dissolved hydrogen content C on the basis of actual measurement data of the temperature, the pressure and the content; and setting an operating temperature of the hydrogen separation membrane formed of the Nb—W—Mo alloy membrane and primary and secondary hydrogen pressure conditions by determining a relationship between the dissolved hydrogen content C and the brittle fracture of the Nb—W—Mo alloy membrane on the basis of the PCT curve to evaluate critical dissolved hydrogen content related to hydrogen embrittlement resistance.

Advantageous Effects of Invention

The present invention provides the following effects a) to e):

a) The hydrogen separation membrane formed of the Nb—W—Mo alloy membrane can be used as a separation membrane for selective hydrogen permeation at high pressure.

b) The hydrogen separation membrane formed of the Nb—W—Mo alloy membrane has high strength and good hydrogen permeation performance.

c) The Nb—W—Mo alloy membrane is useful in practical use because it is inexpensive.

d) The operating conditions of the hydrogen separation membrane formed of the Nb—W—Mo alloy membrane, including the operating temperature and the primary and secondary hydrogen pressure conditions, can be optimized using the PCT curve.

e) Because the operating conditions of the hydrogen separation membrane formed of the Nb—W—Mo alloy membrane can be optimized using the PCT (pressure-dissolved hydrogen content-temperature) curve, the range of hydrogen separation from a hydrogen-containing gas using the hydrogen separation membrane can be extended.

DESCRIPTION OF EMBODIMENTS

Figure 1:
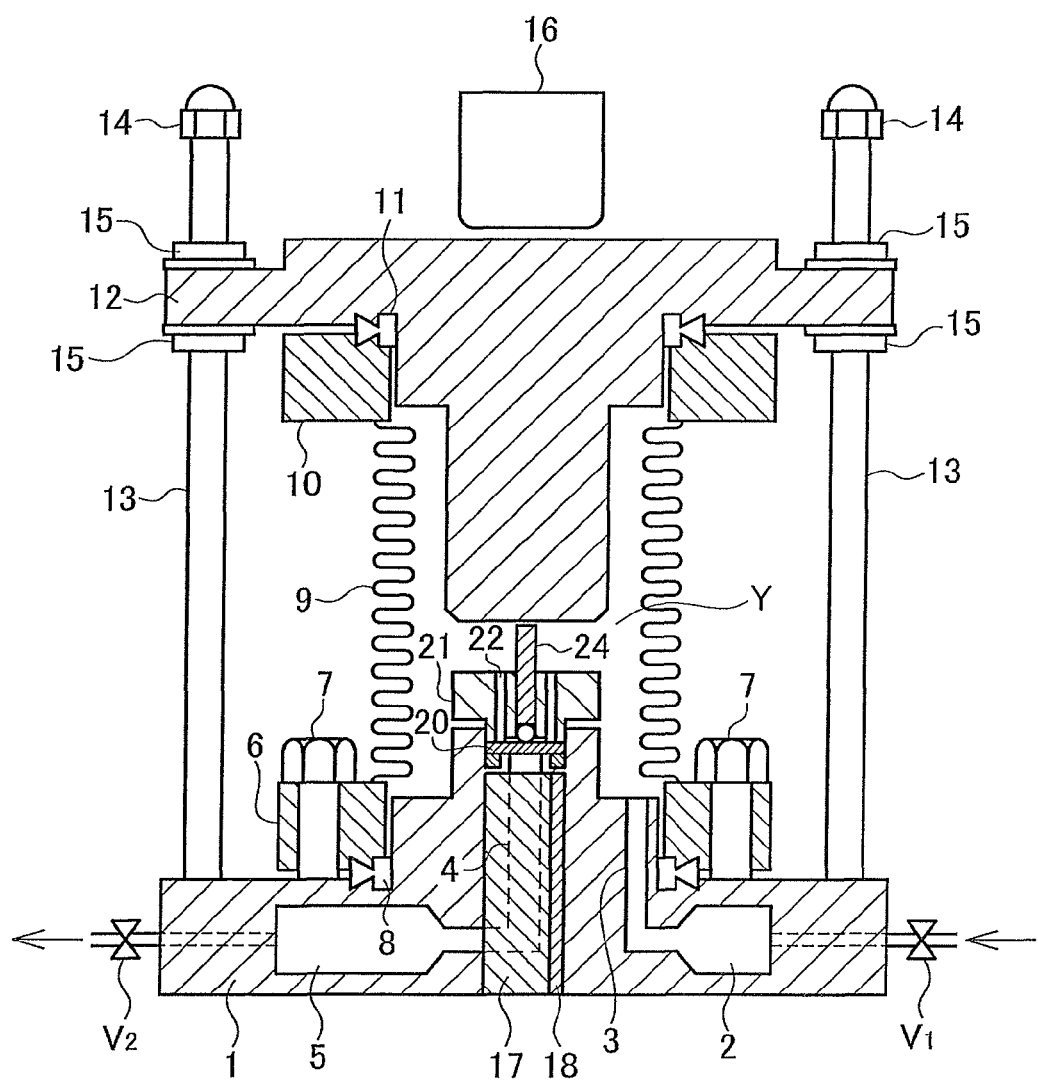
FIG. 1 is a longitudinal sectional view illustrating the structure of a small punch test apparatus and the method for operating the apparatus.

The present invention, including the process of achieving the present invention, will now be detailed.

To increase the permeation rate of hydrogen through a hydrogen separation membrane based on alloys such as Pd-based alloys, the dissolved hydrogen content of the membrane material and the diffusion rate of hydrogen need to be increased. It is known, however, that a high hydrogen dissolution may result in significant hydrogen embrittlement, depending on the type of membrane material. To achieve a membrane material having both high hydrogen permeation rate and hydrogen embrittlement resistance, therefore, it is necessary to examine and grasp the conditions for avoiding embrittlement due to hydrogen as well as to ensure a sufficient hydrogen dissolution of the membrane material.

Nb has a higher hydrogen permeability coefficient than Pd-based alloys such as Pd—Ag alloy, although it is believed that it is difficult to use a Nb-based alloy as a hydrogen separation membrane because hydrogen embrittlement occurs. As disclosed in Patent Documents 2 and 3, for example, a method for inhibiting hydrogen embrittlement by addition of alloying element has been proposed, although there is no proposal as to the conditions where a Nb-based alloy can be used without causing embrittlement by addition of other element.

For Nb alloys, it is difficult to ensure both hydrogen embrittlement resistance and high hydrogen permeation rate, which is industrially important, simply by achieving high solubility or hydrogen permeability coefficient $\Phi$ by simple condition setting or control, such as by specifying the percentage of material added (as often seen in the claims section of patent literature); it is necessary to select an appropriate operating temperature and operating pressure (on the primary and secondary sides) in addition to an appropriate type and amount of material added.

The inventors have developed a technique of determining the optimum conditions for achieving a high hydrogen concentration difference between primary and secondary sides of the membrane using a PCT curve (pressure-composition-temperature curve) while reducing the dissolved hydrogen content by adding another component and have found that that a Nb-based alloy shows ductility in the range of H/M=0.2 or less and can be used at low dissolved hydrogen concentration.

The performance of a hydrogen separation membrane based on an alloy such as a Pd alloy has conventionally been evaluated using the hydrogen permeability coefficient $\Phi$ alone. For Nb alloys, however, the dissolution reaction of hydrogen does not follow Sievert's law ($C=K \times P^{1/2}$); in this case, it is inappropriate to evaluate the hydrogen permeability using the hydrogen permeability coefficient $\Phi$ (=DK).

The hydrogen permeability coefficient $\Phi$ is proportional to the hydrogen permeation rate J as far as Sievert's law holds; however, Patent Document 2 describes the relationship as "hydrogen permeability coefficient $\Phi$=hydrogen permeation performance," and Patent Document 3 only discloses that the hydrogen solubility increased as compared with Pd—Ag alloy, which does not necessarily contribute to an increased hydrogen permeation rate J, which is industrially important.

According to the present invention, however, it has turned out that the hydrogen embrittlement resistance of a Nb—W—Mo alloy membrane can be improved by reducing the dissolved hydrogen content within the operating temperature range of the hydrogen separation membrane.

The Nb—W—Mo alloy membrane of the present invention preferably has the following composition:

W: 30 mol % or less, particularly 0.1 to 30 mol %, more particularly 5 to 15 mol %

Mo: 30 mol % or less, particularly 0.1 to 30 mol %, more particularly 5 to 15 mol %

Nb: balance where the total content of Nb, W, and Mo is 100 mol %. W is preferably added in an amount of 30 mol % or less, particularly 0.1 to 30 mol %, which improves the hydrogen embrittlement resistance as compared with a membrane formed of pure Nb. Mo is preferably added in an amount of 30 mol % or less, particularly 0.1 to 30 mol %, which improves the hydrogen embrittlement resistance as compared with a membrane formed of Nb—W. The Nb—W—Mo alloy membrane of the present invention may contain incidental impurities such as Ta.

The Nb—W—Mo alloy membrane of the present invention can be manufactured by preparing a Nb—W—Mo alloy by a process such as arc melting and subjecting the resulting alloy ingot to at least one of rolling, cutting, and polishing. Alternatively, the Nb—W—Mo alloy membrane may be deposited on a surface of a porous material by a deposition process such as PVD or CVD. The porous material may be any material such as a metal or ceramic.

A thickness of the metal or alloy membrane is preferably, but not limited to, about 1 to 500 µm, particularly about 10 to 50 µm. A layer of Pd or a Pd alloy (e.g., Pd—Ag alloy (Ag content: 10 to 30 wt %)) having a thickness of about 10 to 500 nm, particularly about 50 to 300 nm, is formed on each side of the Nb—W—Mo alloy membrane.

The structure of a hydrogen production system equipped with the hydrogen separation membrane is not particularly limited as long as the system has the hydrogen separation membrane installed in a container such as a housing, casing, or vessel, the system has a primary chamber and a secondary chamber that are separated by the hydrogen separation membrane, and the system further includes heating means if necessary. The membrane may be in any form such as a flat form or a cylindrical form.

A source gas supplied to the hydrogen production system may be any gas containing hydrogen and is exemplified by, but not limited to, steam-reformed hydrocarbon gas, fuel off-gas from fuel cells, biogas containing hydrogen, and gas produced by biomass gasifiers.

An operating temperature of the system (specifically, the primary gas temperature) is typically about 300° C. to 600° C., particularly about 400° C. to 550° C., depending on the membrane composition.

A practical primary gas pressure $P_1$ is, but not limited to, about 0.01 to 4.0 MPa, particularly about 0.5 to 0.9 MPa. A secondary gas pressure $P_2$ is preferably determined taking into account the primary pressure $P_1$ so as to achieve the target hydrogen permeation rate.

EXAMPLES

As a prerequisite for examining a Nb—W—Mo alloy membrane for hydrogen embrittlement resistance, a test apparatus is needed that is capable of quantitatively measuring and evaluating in-situ the mechanical properties, such as hydrogen embrittlement, of a Nb alloy membrane in a hydrogen atmosphere having the same hydrogen pressure on the primary and secondary sides and during hydrogen permeation, that is, in a hydrogen atmosphere having a higher hydrogen pressure on the primary side than on the secondary side within the operating temperature range of the hydrogen separation membrane.

Accordingly, the inventors newly developed a special test apparatus (small punch test apparatus) capable of measuring in-situ the mechanical properties, such as hydrogen embrittlement, of Nb—W—Mo alloy membranes and used the small punch test apparatus to quantitatively measure and evaluate the hydrogen brittleness and other properties of Nb—W—Mo alloy membranes.

With this small punch test apparatus, a hydrogen separation membrane material formed of a Nb—W—Mo alloy can be evaluated for critical dissolved hydrogen content related to hydrogen embrittlement resistance by determining the relationship between the dissolved hydrogen content based on the corresponding PCT (pressure-dissolved hydrogen content-temperature) curve and the mode of deformation and fracture within the operating temperature range. Here, the PCT curve for the Nb—W—Mo alloy membrane means data indicating the relationship between the operating temperature, T, the dissolved hydrogen content, C, and the hydrogen pressure, P.

<Overview of Structure and Test Items of Small Punch Test Apparatus and Method for Operating Apparatus>

Figure 2:
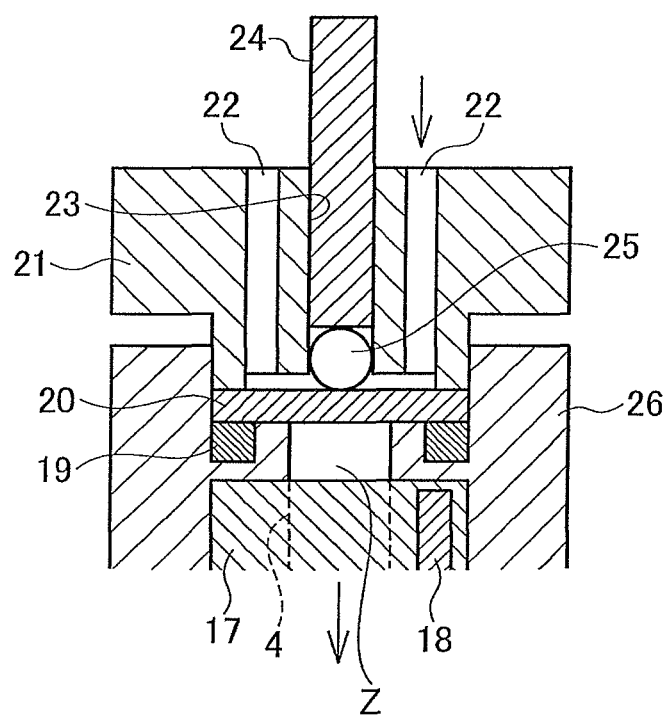
FIG. 2 is an enlarged view of a portion of the apparatus in FIG. 1 around a membrane sample.

An overview of the structure and test items of the small punch test apparatus and the method for operating the apparatus will be given with reference to FIGS. 1 and 2. FIGS. 1 and 2 illustrate the structure of the small punch test apparatus and the method for operating the apparatus, where FIG. 1 is a longitudinal sectional view, and FIG. 2 is an enlarged view of the core portion in FIG. 1. This small punch test apparatus is generally cylindrical.

In FIG. 1, 1 denotes a support member. The support member 1 can also be called a support base; it is herein termed the support member. The support member 1 has two steps (two flanges) in a longitudinal section, with a cylindrical cavity in the center thereof. 2 denotes an inflow hydrogen reservoir provided in the support member 1, 3 denotes a conduit extending from the inflow hydrogen reservoir 2 to a primary hydrogen atmosphere Y, described later, 5 denotes an outflow hydrogen reservoir provided in the support member 1, and 4 denotes a conduit extending from a secondary hydrogen atmosphere Z, described later, to the outflow hydrogen reservoir 5.

The inflow hydrogen reservoir 2 communicates with a conduit, having a valve $V_1$, for supplying hydrogen to the inflow hydrogen reservoir 2, whereas the outflow hydrogen reservoir 5 communicates with a conduit, having a valve $V_2$, for discharging hydrogen from the outflow hydrogen reservoir 5.

A flange member 6 for fixing the lower end of a bellows 9 (hereinafter referred to as the fixing member) is disposed on the first one (the lower one in the figure) of the two steps (two flanges) of the support member 1. The fixing member 6 is fixed to the flange of the support member 1 with bolts 7, and the gap between the fixing member 6 and the flange is hermetically sealed with a gasket (formed of copper) 8.

12 denotes a vertically movable upper lid member disposed at an upper position opposite the support member 1. The upper lid member 12 has two inverted steps (two flanges) in a longitudinal section. A flange member 10 for fixing the upper end of the bellows 9 is disposed on the first one (the upper one in the figure) of the two inverted steps (two flanges) of the upper lid member 12. The fixing member 10 is fixed to the flange of the upper lid member 12 with bolts (not shown), and the gap between the fixing member 10 and the flange of the upper lid member 12 is hermetically sealed with a gasket (formed of copper) 11.

13 denotes sliding shafts for moving the upper lid member 12 vertically, with the lower end thereof fixed to the support member 1. 16 denotes a compression rod, joined to a load cell, for applying pressure from above. After a membrane sample 20, described later, is set, the upper lid member 12 is moved downward along the sliding shafts 13, and accordingly a puncher 24, described later, is moved downward, thus applying a predetermined load (compressing force) to the membrane sample 20, described later. 14 denotes lock nuts (cap nuts) for preventing detachment of the upper lid member 12 as the pressure in the closed space Y increases, and the upper lid member 12 can be moved downward along the sliding shafts 13 with slide bushes 15 therebetween.

The closed space Y, surrounded by the support member 1, the fixing member 6, the gasket 8, the bellows 9, the fixing member 10, the upper lid member 12, the gasket 11, the inflow hydrogen reservoir 5, the top surface of the membrane sample 20, described later, and a fixing member 21, described later, forms the primary hydrogen atmosphere Y for the membrane sample 20, described later, whereas the space surrounded by the bottom surface of the membrane sample 20, described later, the conduit 4, and the outflow hydrogen reservoir 5 forms the secondary hydrogen atmosphere Z.

<Application of Hydrogen Pressure to Membrane Sample>

The primary hydrogen pressure is adjusted by adjusting the amount of hydrogen supplied through the inflow hydrogen reservoir 2 and the conduit 3 with the valve $V_1$, whereas the hydrogen pressure of the secondary hydrogen atmosphere is adjusted by adjusting the amount of hydrogen released through the conduit 4 and the outflow hydrogen reservoir 5 with the valve $V_2$. In this way, the primary and secondary hydrogen atmospheres for the membrane sample 20 can be controlled to the same hydrogen pressure or to different hydrogen pressures.

<Application of Load to Membrane Sample and Measurement>

20 denotes a membrane sample, and 19 denotes a gasket (formed of stainless steel) for supporting the membrane sample 20. 21 denotes a member for fixing the membrane sample 20, 24 denotes a puncher, and 25 denotes a steel or silicon nitride ball. The fixing member 21 has an inverted step in the bottom thereof and four through-pores 22 extending from the lower end surface to the upper end surface thereof. The bottom surface having an inverted step is spaced apart from the top surface of the membrane sample, and the through-pores 22 communicate with the hydrogen atmosphere Y.

The fixing member 21 has a cylindrical cavity extending vertically in the center thereof, with the four fine holes arranged concentrically. The puncher 24 is inserted into the cylindrical cavity in the center of the fixing member 21 along an inner wall 23 thereof, and the steel or silicon nitride ball 25 is brought into contact with and is placed on the top surface of the membrane sample 20. The steel or silicon nitride ball 25 can be lowered and pressed against the membrane sample 20 by the puncher 24 to examine the membrane sample for a change in shape corresponding to a predetermined load and, if there is a change in shape, the degree of the change. The predetermined load is measured with the compression rod 16 joined to the load cell.

A ceramic heater 17 is built into the vicinity of the cylindrical cavity in the center of the fixing member 1, and a thermocouple 18 is inserted close to the membrane sample 20. The ceramic heater 17 and the thermocouple 18 are used to measure and control the temperature of the membrane sample.

The small punch test apparatus can apply a hydrogen pressure of vacuum to 0.3 MPa to a Nb—W—Mo alloy membrane, can control temperature in the range of room temperature to 600° C., and can evaluate ductile-brittle transition under such conditions.

<Test on Nb—W—Mo Alloy Membrane Using Small Punch Test Apparatus>

The small punch test apparatus was used to test the following test pieces:

Sample 1: pure Nb membrane;

Sample 2: Nb-5 mol % W alloy membrane (Nb—W alloy membrane containing W in an amount of 5 mol % of the total content of Nb and W);

Sample 3: Nb-7 mol % W alloy membrane (Nb—W alloy membrane containing W in an amount of 7 mol % of the total content of Nb and W);

Sample 4: Nb-5 mol % W-5 mol % Mo alloy membrane (Nb—W—Mo alloy membrane containing W and Mo, each in an amount of 5 mol % of the total content of Nb, W, and Mo);

Sample 5: Nb-5 mol % W-10 mol % Mo alloy membrane (W: 5 mol %; Mo: 10 mol %; Nb: 85 mol %); and Sample 6: Nb-5 mol % W-15 mol % Mo alloy membrane (W: 5 mol %; Mo: 15 mol %; Nb: 80 mol %).

All these samples were test pieces 10 mm in length and width and 0.5 mm in thickness (volume: 10 mm×10 mm×0.5 mm=50 mm³) produced by preparing an alloy ingot by arc melting and cutting and polishing the alloy ingot.

These test pieces were evaluated by measuring the "load-deflection" in a small punch test after determining the relationship between the hydrogen pressure P and the dissolved hydrogen content C (H/M (the atomic ratio of hydrogen atoms to metal atoms; the same applies to the same type of designation)) in the range of 0.001 to more than 0.30 ($1 \times 10^{-3}$ to more than $3 \times 10^{-1}$) MPa at temperatures of 400° C., 450° C., and 500° C. using a PCT (pressure-dissolved hydrogen content-temperature) measurement apparatus.

The primary hydrogen atmosphere Y and the secondary hydrogen atmosphere Z had the same hydrogen pressure.

The quantitative evaluation of hydrogen embrittlement in the small punch test was carried out by the following i) to iii):

i) The test piece of the "Nb-5 mol % W-5 mol % Mo alloy membrane" was maintained in an atmosphere at a temperature of 500° C. and a hydrogen pressure of 0.01 MPa for one hour and was then deformed by applying compressing force under the load of the steel or $Si_3N_4$ ball 25 while recording the load and the displacement of the crosshead (or the steel or silicon nitride ball 25), which was continued until the test piece fractured, thus generating a "load-deflection" curve.

ii) The dissolved hydrogen content of the test piece (H/M (H/M is the atomic ratio of hydrogen atoms to metal atoms)) was estimated from the hydrogen pressure applied in the test on the basis of a PCT curve for the test temperature, namely, 500° C. (≈773 K).

iii) The small-punch absorbed energy until the membrane sample fractured was determined from the "load-deflection" curve. Here, the small-punch absorbed energy corresponds to (is equivalent to) the work required from the start of the deformation of the test piece until it fractured. The small-punch absorbed energy was calculated by integrating the pressure under which the steel or $Si_3N_4$ ball 25 was lowered by the puncher 24, namely, the load (MPa), with respect to the amount of deflection (i.e., calculating the area under the load-deflection curve).

<Measurement Using PCT Measurement Apparatus>

Figure 3:
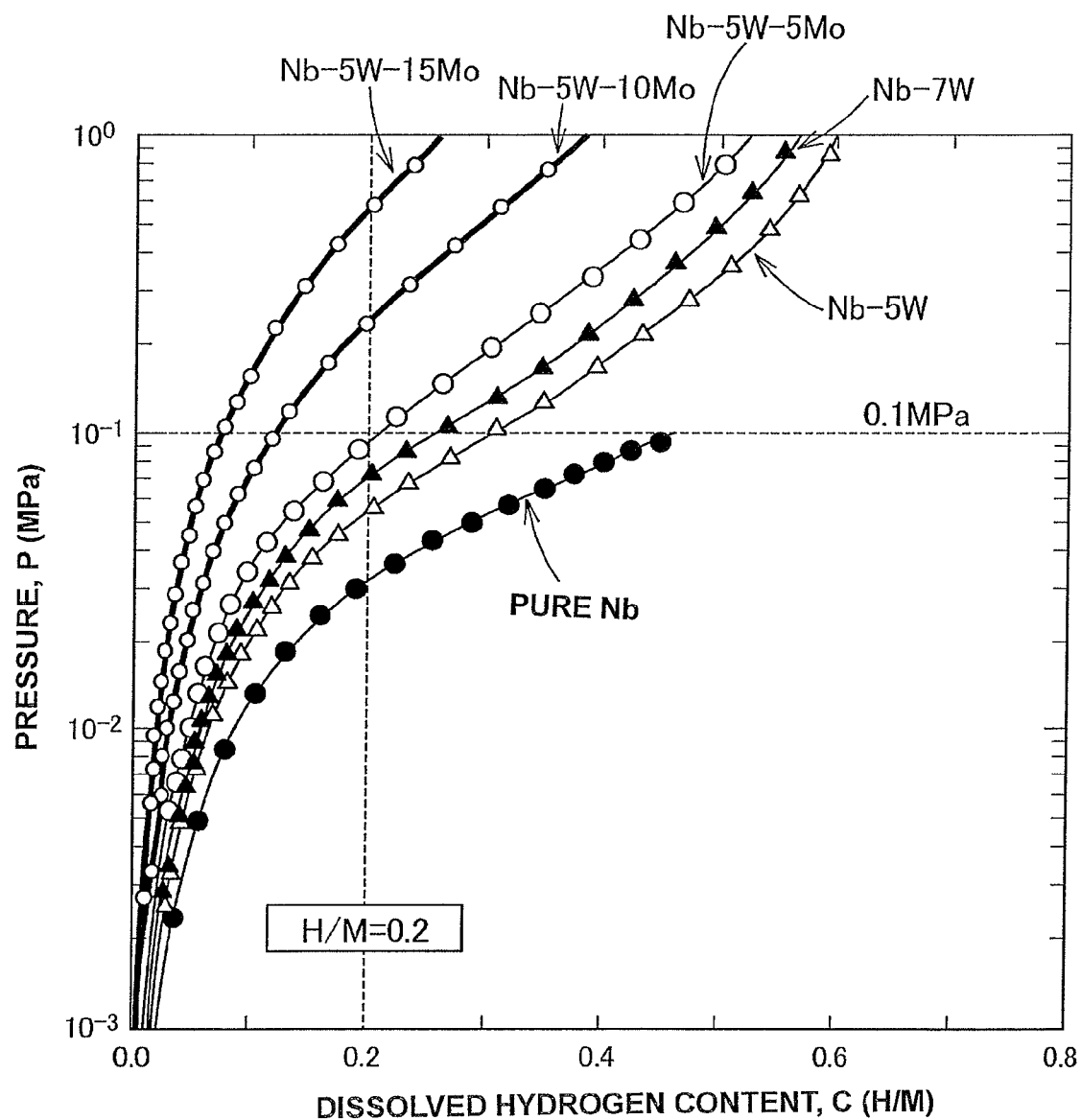
FIG. 3 is a plot of the relationship between the hydrogen pressure P of an atmosphere and dissolved hydrogen content C at a temperature of 500° C. for Nb-based alloy membranes.
Figure 4:
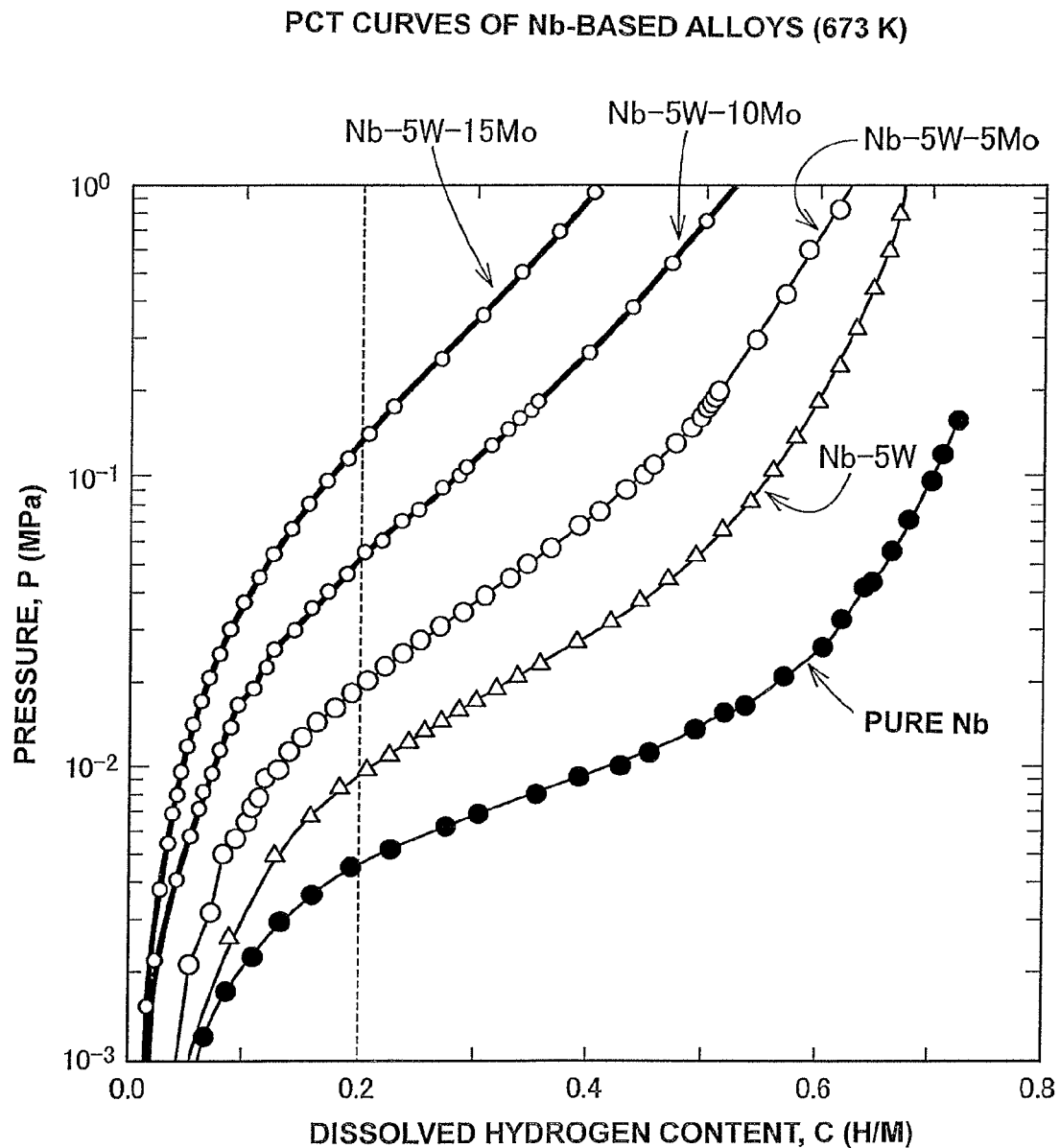
FIG. 4 is a plot of the relationship between the hydrogen pressure P of an atmosphere and dissolved hydrogen content C at a temperature of 400° C. for Nb-based alloy membranes.
Figure 6:
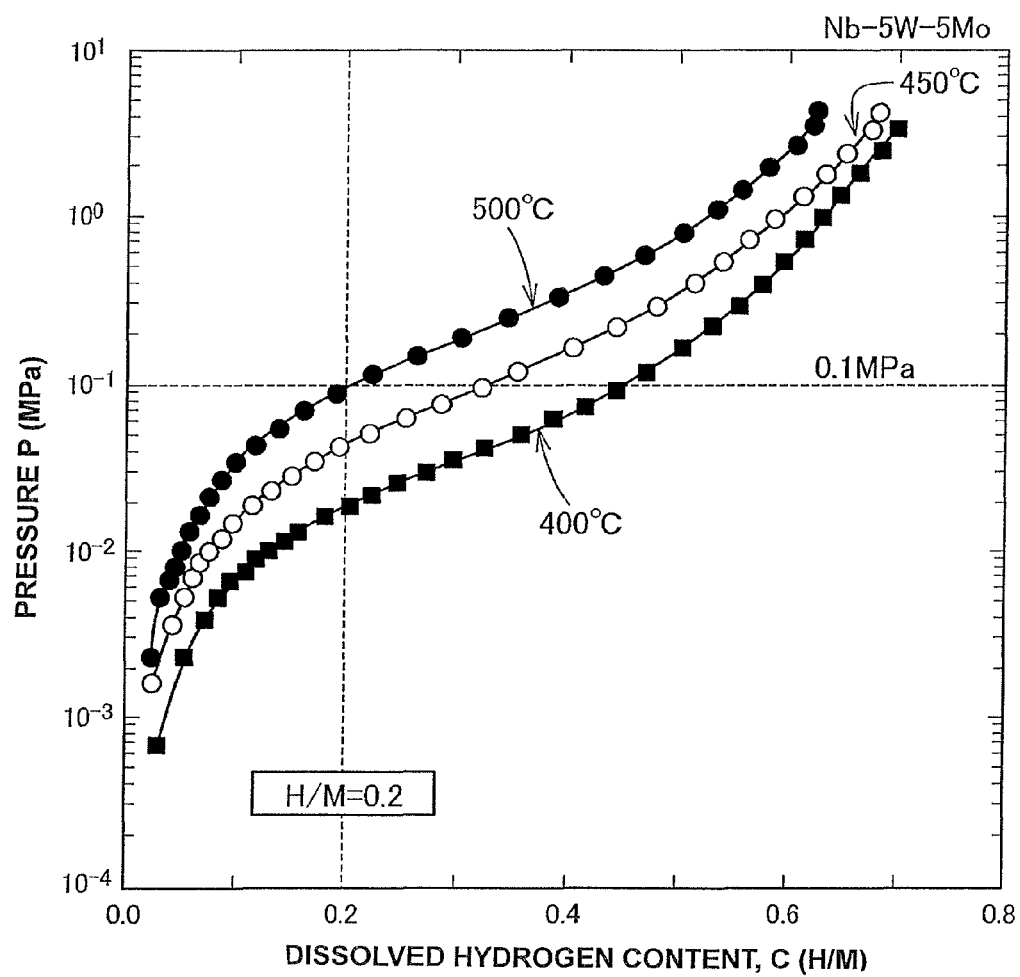
FIG. 6 is a plot of the relationship between the hydrogen pressure P of an atmosphere and dissolved hydrogen content C at temperatures of 500° C., 450° C., and 400° C. for a Nb-5 mol % W-5 mol % Mo alloy membrane.

As an example of measurements obtained using a PCT (pressure-dissolved hydrogen content-temperature) measurement apparatus, FIGS. 3 and 4 show the relationship between the dissolved hydrogen content C and the hydrogen pressure P at temperatures of 500° C. (773 K) and 400° C. (673 K), respectively, for each test piece. In addition, FIG. 6 shows the relationship between the dissolved hydrogen content C and the hydrogen pressure P at temperatures of 500° C., 450° C., and 400° C. for Sample 4 (Nb-5 mol % W-5 mol % Mo). In FIGS. 3, 4, and 6, the vertical axis is the hydrogen pressure P (MPa), and the horizontal axis is the dissolved hydrogen content C (H/M).

Here, the PCT measurement apparatus, which complies with JIS H7201 (2007), is an apparatus that measures the properties (the pressure P and the amount of hydrogen absorbed C) related to the absorption and release of hydrogen into and from a material at a certain temperature T. The dissolved hydrogen content C in FIGS. 3, 4 and 6 is equivalent to the amount of hydrogen absorbed C.

The applicable pressure range of the Nb-5 mol % W alloy membrane was 0.01 MPa (about 0.1 atm) or less at 400° C. and was 0.05 MPa (about 0.5 atm) or less at 500° C.; this alloy membrane was applicable only in a limited range.

In contrast, as shown in FIGS. 3, 4, and 6, the addition of Mo as an element for reducing the dissolved hydrogen content of the Nb-5 mol % W alloy membrane shifted the PCT curve to higher hydrogen pressures, thus allowing it to be used up to 0.6 MPa (about 6 atm) at 500° C.

Figure 5:
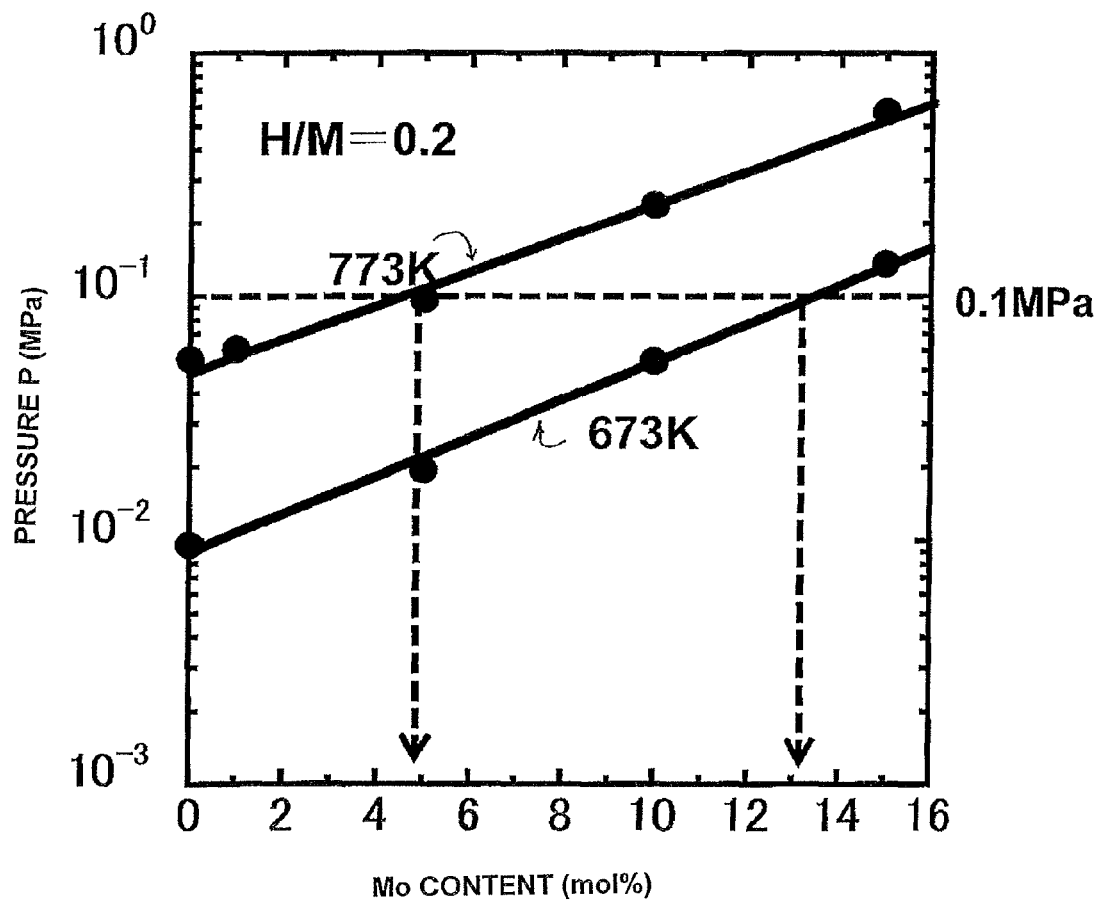
FIG. 5 is a graph showing the relationship between the equilibrium hydrogen pressure and Mo content of Nb—W—Mo alloys.

FIG. 5 shows the relationship between the equilibrium hydrogen pressure at dissolved hydrogen concentration H/M=0.2 and the Mo content of Nb-5 mol % W-5 mol % Mo, Nb-5 mol % W-10 mol % Mo, and Nb-5 mol % W-15 mol % Mo. The values of P at 773 K in FIG. 5 are the values of P at H/M=0.2 in FIG. 3, and the values of P at 673 K in FIG. 5 are the values of P at H/M=0.2 in FIG. 4.

Figure 8:
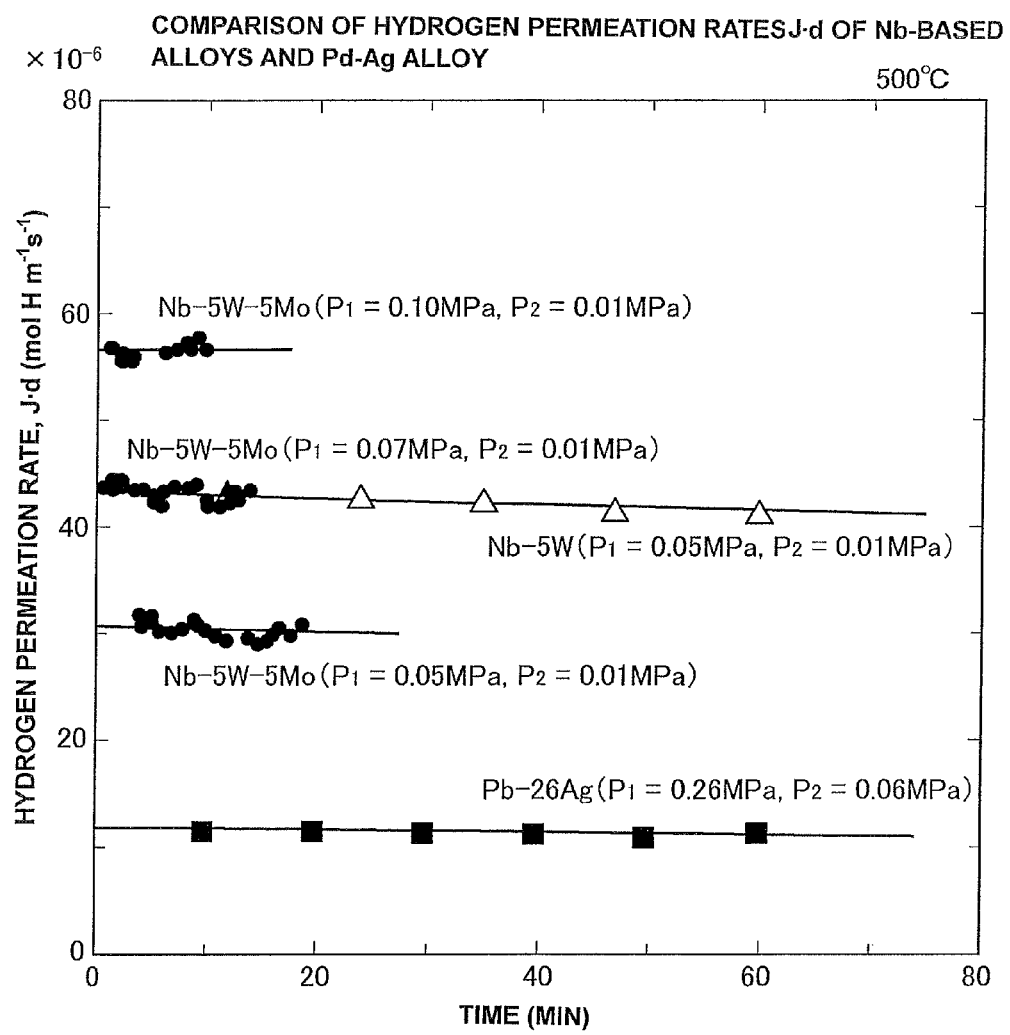
FIG. 8 is a graph showing the test conditions and results of a hydrogen permeation test at 500° C. for Pd-26 mol % Ag alloy, Nb-5 mol % W alloy, and Nb-5 mol % W-5 mol % Mo alloy.

In addition, as shown in FIG. 8, described later, the results of a hydrogen permeation test demonstrated that a Nb—W—Mo alloy membrane can be used to provide a higher hydrogen permeation rate than a Nb-5 mol % W alloy membrane.

<Small Punch Test>

Figure 7:
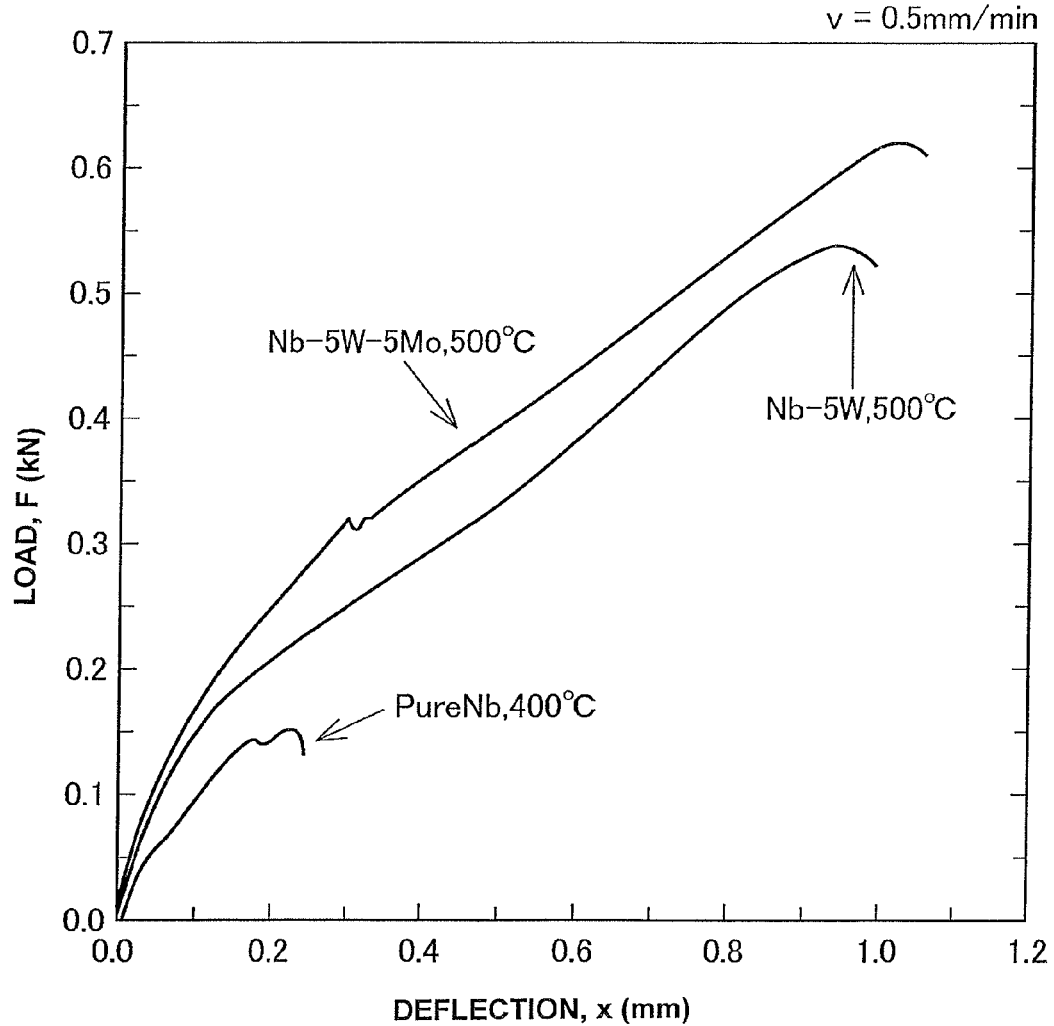
FIG. 7 is a graph showing the deformability ("load-deflection" curve) of pure Nb, a Nb-5 mol % W alloy, and a Nb-5 mol % W-5 mol % Mo alloy determined by a small punch test.

As an example of the results of the small punch test, FIG. 7 shows the "load-deflection" curves of the Nb-5 mol % W alloy membrane and the Nb-5 mol % W-5 mol % Mo alloy membrane. These are the results obtained at a hydrogen pressure of 0.01 MPa. FIG. 7 also shows the results for pure Nb for comparison. The moving speed V of the crosshead (the moving speed of the steel or silicon nitride ball 25) of the test apparatus was 0.5 mm/min.

As shown in FIG. 7, the results of the in-situ small punch test in hydrogen at 500° C. demonstrated that the Nb-5 mol % W-5 mol % Mo alloy membrane, having a larger area under the curve, had a higher small-punch absorbed energy and therefore a higher ductility than the Nb-5 mol % W alloy membrane.

<Hydrogen Permeation Test>

Figure 9:
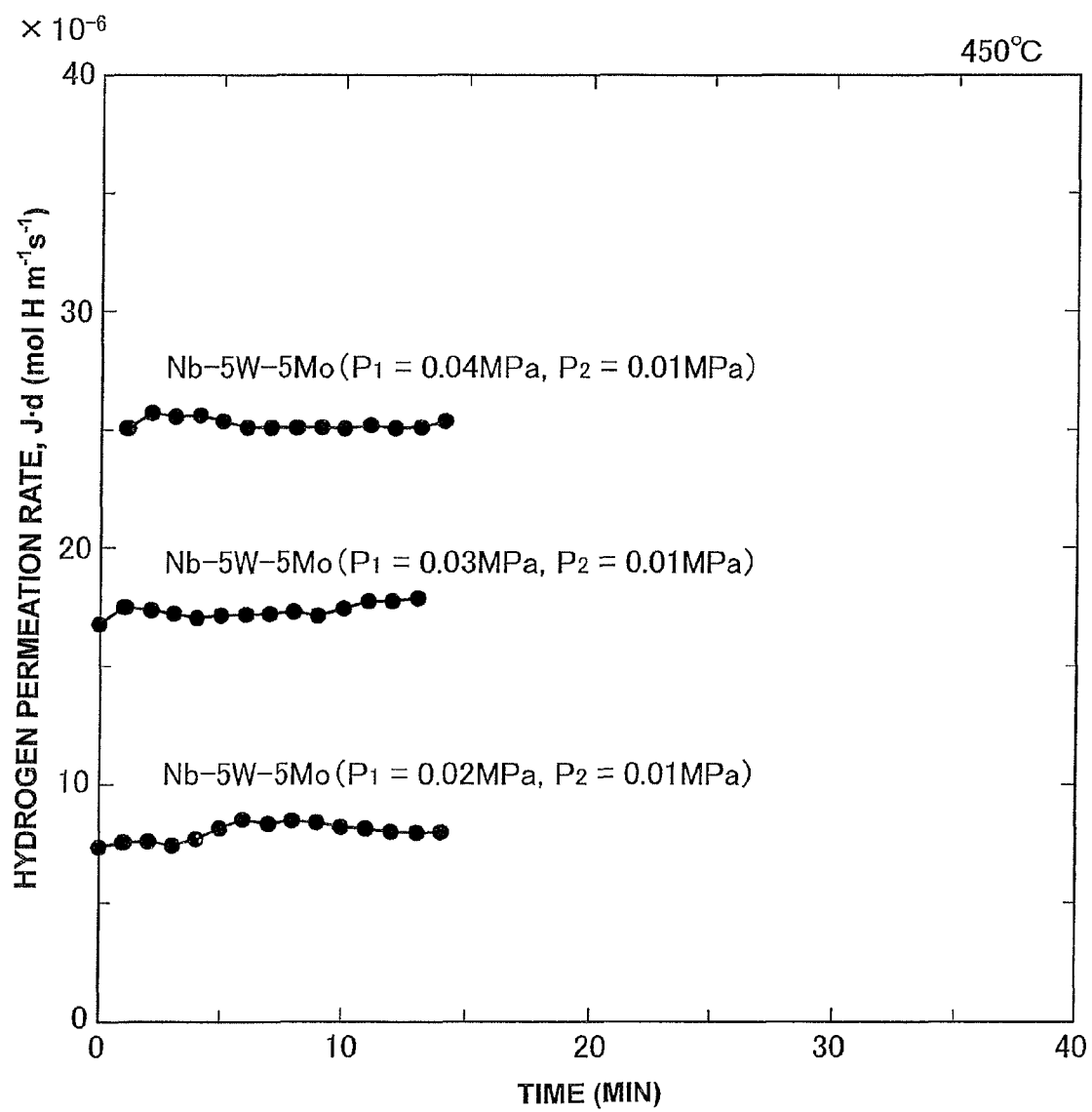
FIG. 9 is a graph showing the test conditions and results of a hydrogen permeation test at 450° C. for Nb-5 mol % W-5 mol % Mo alloy.
Figure 10:
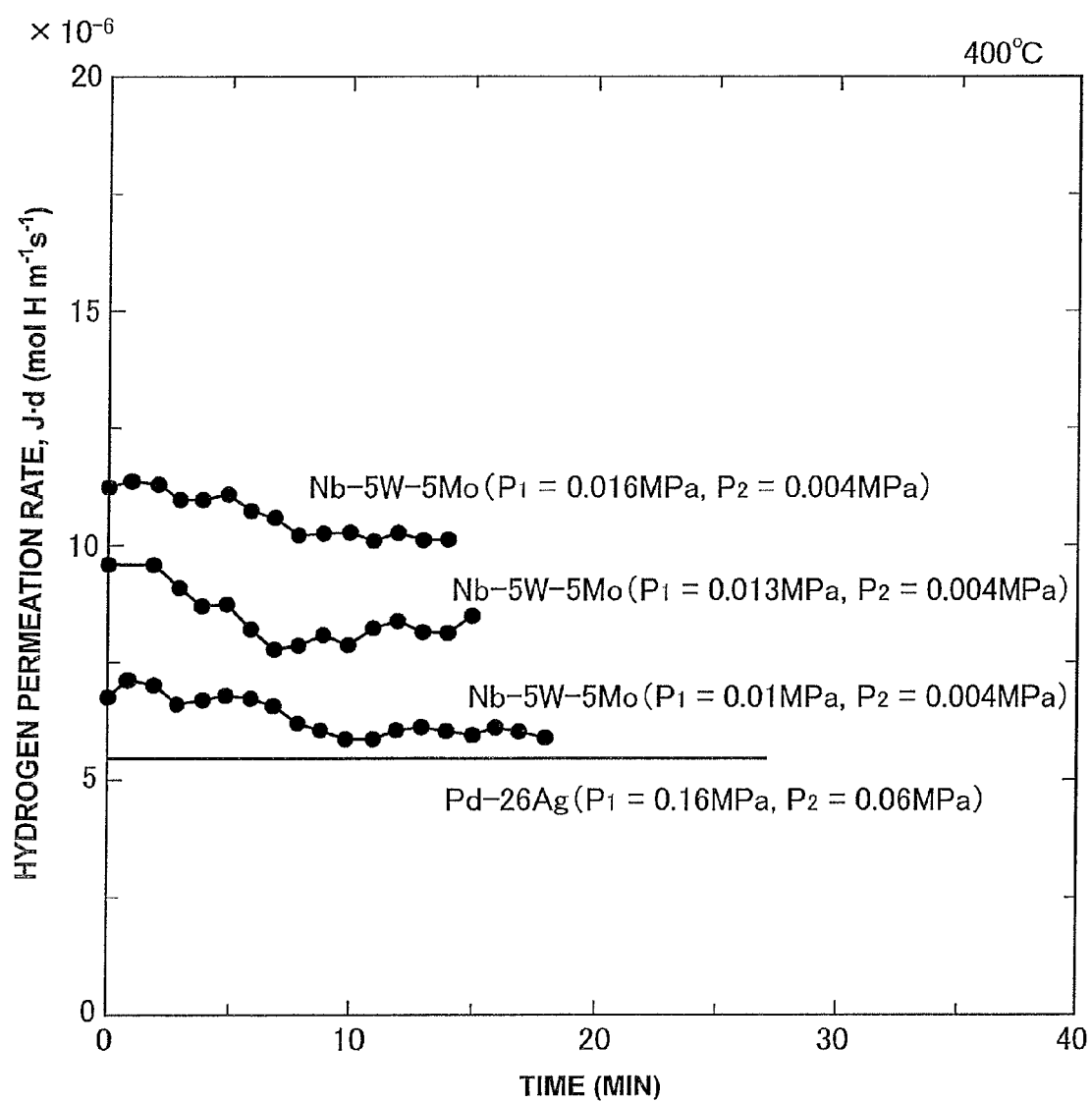
FIG. 10 is a graph showing the test conditions and results of a hydrogen permeation test at 400° C. for Pd-26 mol % Ag alloy and Nb-5 mol % W-5 mol % Mo alloy.

FIGS. 8 to 10 show the results of the hydrogen permeation test for the Nb-5 mol % W-5 mol % Mo alloy membrane. FIG. 8 shows the results obtained at 500° C., FIG. 9 shows the results obtained at 450° C., and FIG. 10 shows the results obtained at 400° C. FIG. 8 also shows the results for the Nb-5 mol % W alloy membrane and a Pd-26 mol % Ag alloy membrane, and FIG. 10 also shows the results for the Pd-26 mol % Ag alloy membrane. The horizontal axis in FIGS. 8 to 10 is the time from the start of the test, and the vertical axis is the hydrogen permeation rate J·d(mol·m$^{-1}$·s$^{-1}$), which is the amount of hydrogen permeated per unit time (s) per unit area (m$^2$) normalized by the reciprocal of the thickness (m). The symbol "mol H" in the designation of the vertical axis in FIG. 8 means the number of moles in terms of hydrogen atoms (=number of atoms). In FIGS. 8 to 10, additionally, $P_1$ indicates the primary hydrogen partial pressure (MPa) during the measurement of hydrogen permeation rate, and $P_2$ indicates the secondary hydrogen partial pressure (MPa).

As shown in FIG. 8, the Nb-5 mol % W alloy membrane had a hydrogen permeation rate of 43×10$^{-6}$ mol·m$^{-1}$·s$^{-1}$. In contrast, the Pd-26 mol % Ag alloy membrane had a permeation rate of 12×10$^{-6}$ mol·m$^{-1}$·s$^{-1}$. Thus, the Nb-5 mol % W alloy membrane had a high hydrogen permeation rate, while the Nb-5 mol % W-5 mol % Mo alloy membrane according to the present invention had a hydrogen permeation rate of 57×10$^{-6}$ mol·m$^{-1}$·s$^{-1}$, that is, a several times higher hydrogen permeation rate than the Pd—Ag alloy membrane despite a smaller pressure difference.

Hydrogen separation using a Pd-based alloy membrane, such as a Pd-26 mol % Ag alloy membrane, requires a certain hydrogen partial pressure difference (ΔP) to ensure a large amount of hydrogen flux J (J=D·ΔC/d (D is the diffusion coefficient, ΔC is the dissolved hydrogen concentration difference, and d is the thickness)) because it follows Sievert's law, namely, C=K×P$^{1/2}$; a Nb-based alloy, which does not follow Sievert's law, provides a large dissolved hydrogen concentration difference (ΔC) with a small hydrogen partial pressure difference (ΔP), thus providing a large amount of hydrogen flux (J).

By measuring a PCT curve at the operating temperature, it is possible to determine the hydrogen pressure conditions under which the Nb—W—Mo-based alloy membrane according to the present invention can be used. At 500° C., as described above, the alloy membrane can be used as a hydrogen separation membrane with a hydrogen partial pressure of 0.6 MPa (about 6 atm) or less.

In addition, the evaluation of J·d (=J×d=Jd), which is the hydrogen permeation flux J of the Nb—W—Mo-based alloy membrane normalized by the reciprocal of the thickness d, namely, 1/d, demonstrated that the Nb—W—Mo-based alloy membrane had a higher hydrogen permeation rate with a smaller partial pressure difference than the Pd—Ag alloy membrane. If the hydrogen permeation conditions are such that process side (primary side)/permeation side (secondary side)=0.1 MPa/0.01 MPa at 500° C., the Nb-5 mol % W-5 mol % Mo alloy membrane provides a 5.7 times larger amount of hydrogen flux than the Pd-26 mol % Ag alloy membrane (process side (primary side)/permeation side (secondary side)= 0.26 MPa/0.06 MPa) as a hydrogen separation membrane having the same area and the same thickness. In addition, the Nb-5 mol % W-5 mol % Mo alloy membrane provides a 1.4 times larger amount of hydrogen permeated than the Nb-5 mol % W alloy membrane (process side (primary side)/permeation side (secondary side)=0.05 MPa/0.01 MPa). The Pd-26 mol % Ag alloy membrane had an apparent hydrogen permeability Φ of 2.3×10$^{-8}$ (mol$^{-1}$·m$^{-1}$·s$^{-1}$·Pa$^{-1/2}$), whereas the Nb-5 mol % W-5 mol % Mo alloy membrane had an apparent hydrogen permeability Φ of 1.3×10$^{-7}$ (mol$^{-1}$·m$^{-1}$·s$^{-1}$·Pa$^{-1/2}$) which is about 5.7 times higher.

According to the present invention, hydrogen can be separated from a hydrogen-containing gas at a hydrogen partial pressure of, for example, 1 atm more efficiently than a conventional membrane such as a Pd—Ag alloy membrane despite a smaller hydrogen concentration difference, and the amount of precious metal used, such as Pd or Ag, can be reduced, thereby contributing to a reduction in the cost of hydrogen separation membranes. A Nb—W—Mo-based alloy membrane, having a higher hydrogen permeation rate than a Nb—W-based alloy membrane, can be used as a non-palladium hydrogen separation membrane to enable hydrogen production through more efficient hydrogen separation.

While the present invention has been illustrated in detail with a particular embodiment, it is obvious to those skilled in the art that various modifications are possible without departing from the spirit and scope of the present invention.

This application is based on Japanese Patent Application No. 2009-212357 filed on Sep. 14, 2009, the entire contents of which are incorporated herein by reference.

1 support member
2 inflow hydrogen reservoir provided in support member 1
3 conduit extending from inflow hydrogen reservoir 2 to primary hydrogen atmosphere Y
4 conduit extending from secondary hydrogen atmosphere Z to outflow hydrogen reservoir 5

5 outflow hydrogen reservoir provided in support member 1
6 flange member for fixing lower end of bellows 9
7 bolt
8 gasket
9 bellows
10 flange member for fixing upper end of bellows 9
11 gasket
12 vertically movable upper lid member disposed at upper position opposite support member 1
13 sliding shaft
14 cap nut
15 slide bush
16 compression rod joined to load cell
17 ceramic heater
18 thermocouple
19 gasket for supporting membrane sample 20
20 membrane sample
21 member for fixing membrane sample 20
22 through-pore
23 inner wall of cylindrical cavity in center of fixing member 21
24 puncher
25 steel or $Si_3N_4$ ball
26 protrusion of support member 1

The invention claimed is:

1. A hydrogen separation membrane, comprising:
a Nb—W—Mo alloy membrane containing Nb, W, and Mo,
wherein the alloy comprises 5 to 15 mol % of W and 5 to 15 mol % of Mo, and the balance comprises Nb.

2. A method for selectively separating hydrogen from a hydrogen-containing gas using the hydrogen separation membrane according to claim 1.

3. The method for selectively separating hydrogen according to claim 2, wherein the method comprises the steps of:
measuring a hydrogen pressure P of a hydrogen atmosphere for the Nb—W—Mo alloy membrane and a dissolved hydrogen content C of the Nb—W—Mo alloy membrane at a temperature T;
generating a PCT curve associating the temperature T, the hydrogen pressure P, and the dissolved hydrogen content C on the basis of actual measurement data of the temperature, the pressure and the content;
setting an operating temperature of the hydrogen separation membrane and primary and secondary hydrogen pressure conditions by determining a relationship between the dissolved hydrogen content C and a brittle fracture of the Nb—W—Mo alloy membrane on the basis of the PCT curve to evaluate critical dissolved hydrogen content related to hydrogen embrittlement resistance; and
separating hydrogen from the hydrogen-containing gas using the Nb—W—Mo alloy membrane under the set conditions.

4. The method for selectively separating hydrogen according to claim 2, wherein hydrogen is separated from the hydrogen-containing gas at a temperature between 400° C. and 500° C.

5. A method for setting conditions for separating hydrogen from a hydrogen-containing gas using a hydrogen separation membrane comprising a Nb—W—Mo alloy membrane, comprising the steps of:
measuring a hydrogen pressure P of a hydrogen atmosphere for the Nb—W—Mo alloy membrane and a dissolved hydrogen content C of the Nb—W—Mo alloy membrane at a temperature T;
generating a PCT curve associating the temperature T, the hydrogen pressure P, and the dissolved hydrogen content C on the basis of actual measurement data of the temperature, the pressure and the content; and
setting an operating temperature of the hydrogen separation membrane comprising the Nb—W—Mo alloy membrane and primary and secondary hydrogen pressure conditions by determining a relationship between the dissolved hydrogen content C and a brittle fracture of the Nb—W—Mo alloy membrane on the basis of the PCT curve to evaluate critical dissolved hydrogen content related to hydrogen embrittlement resistance,
wherein the alloy comprises 5 to 15 mol % of W and 5 to 15 mol % of Mo, and the balance comprises Nb.

6. The hydrogen separation membrane according to claim 1, wherein the alloy comprises 5 mol % of W and 5 mol % of Mo, and the balance comprises Nb.

7. The method according to claim 5, wherein the alloy comprises 5 mol % of W and 5 mol % of Mo, and the balance comprises Nb.

8. The hydrogen separation membrane according to claim 1, wherein the alloy consists essentially of 5 to 15 mol % of W and 5 to 15 mol % of Mo, and the balance comprises Nb.

* * * * *